(12) United States Patent
Aubele et al.

(10) Patent No.: US 9,855,710 B2
(45) Date of Patent: Jan. 2, 2018

(54) METHOD AND ASSEMBLY FOR MANUFACTURING A LEAF SPRING

(71) Applicant: BENTELER SGL GMBH & CO. KG, Paderborn (DE)

(72) Inventors: Tobias Aubele, Mittelstetten (DE); Ulrich Mueller, Langweid am Lech (DE); Hannah Paulus, Wemding (DE); Andreas Steinle, Meitingen (DE); Bernd Wohletz, Meitingen (DE); Ralph Wojtczyk, Wertingen (DE)

(73) Assignee: BENTELER SGL GMBH & CO. KG., Paderborn (DE)

( * ) Notice: Subject to any disclaimer, the term of this patent is extended or adjusted under 35 U.S.C. 154(b) by 0 days.

(21) Appl. No.: 14/920,507

(22) Filed: Oct. 22, 2015

(65) Prior Publication Data

US 2016/0114537 A1    Apr. 28, 2016

(30) Foreign Application Priority Data

Oct. 23, 2014   (DE) ......................... 10 2014 115 461

(51) Int. Cl.
*B29C 70/32*    (2006.01)
*B29C 70/34*    (2006.01)
(Continued)

(52) U.S. Cl.
CPC .............. *B29C 70/32* (2013.01); *B29C 70/06* (2013.01); *B29C 70/347* (2013.01); *B32B 5/26* (2013.01);
(Continued)

(58) Field of Classification Search
CPC ... B32B 38/1808; B32B 37/187; B32B 37/10; B32B 37/0076; B32B 2605/00;
(Continued)

(56) References Cited

U.S. PATENT DOCUMENTS 3,142,598 A  *  7/1964  Rosen .................. B29C 70/347
                                                              156/162
2015/0069681 A1    3/2015  Muller

FOREIGN PATENT DOCUMENTS

DE    102008028441 A1   12/2009
DE    102011012654 A1    8/2012
(Continued)

OTHER PUBLICATIONS

Machine translation of DE 10 2008 028 441.*

*Primary Examiner* — Vishal I Patel
(74) *Attorney, Agent, or Firm* — Hauptman Ham, LLP (57) ABSTRACT

The present invention relates to a method and an assembly for manufacturing a leaf spring from a fiber-composite material. To this end, tape material from a fiber material, which has been pre-impregnated with a matrix resin, for manufacturing a semi-finished leaf spring is wound under tension onto a winding core, wherein at least two cavities for shaping are configured on the winding core. The tape material here is pressed on by way of a contact pressure means, such that adjacent layers of the fiber material are adhesively interconnected and air pockets are removed. The semi-finished leaf spring under impingement by pressure and heat and under curing of the matrix resin is finally processed to form a leaf spring.

11 Claims, 6 Drawing Sheets (51) Int. Cl.
*F16F 1/368* (2006.01)
*B29C 70/06* (2006.01)
*B32B 5/26* (2006.01)
*B32B 37/00* (2006.01)
*B32B 37/10* (2006.01)
*B32B 38/00* (2006.01)
*B32B 38/18* (2006.01)
*B29L 31/00* (2006.01)
*B29C 53/56* (2006.01)
*B29K 105/12* (2006.01)

(52) U.S. Cl.
CPC ...... *B32B 37/0053* (2013.01); *B32B 37/0076* (2013.01); *B32B 37/10* (2013.01); *B32B 37/187* (2013.01); *B32B 38/0012* (2013.01); *B32B 38/1808* (2013.01); *F16F 1/368* (2013.01); *B29C 53/564* (2013.01); *B29K 2105/12* (2013.01); *B29L 2031/774* (2013.01); *B32B 2605/00* (2013.01)

(58) Field of Classification Search
CPC ... B32B 5/26; B32B 37/0053; B32B 38/0012; F16F 1/368; B29K 2105/12; B29C 70/32; B29C 70/06; B29C 70/347; B29C 53/564; B29L 2031/774
See application file for complete search history.

(56) References Cited

FOREIGN PATENT DOCUMENTS

| | | |
|---|---|---|
| DE | 102011104071 A1 | 12/2012 |
| EP | 0005916 A1 | 12/1979 |
| EP | 0216748 A1 | 4/1987 |
| GB | 2113599 A | 8/1983 |
| GB | 2131347 A | 6/1984 |
| JP | S59146816 A | 8/1984 |
| WO | 2010003494 A1 | 1/2010 |

* cited by examiner

METHOD AND ASSEMBLY FOR MANUFACTURING A LEAF SPRING

The present application claims priority from German Application Number 10 2014 115 461.4, filed Oct. 23, 2014, the disclosure of which is hereby incorporated by reference herein in its entirety.

The present invention relates to a method for manufacturing a leaf spring from a fiber-composite material, and an assembly for manufacturing a leaf spring from a fiber-composite material, according to the features of the independent claims.

Leaf springs from a fiber-composite material play an important role in modern automotive manufacturing. By combining thermoplastic or duroplastic man-made materials as a matrix material with fiber materials from glass, carbon, or similar, a significant reduction in weight may be created, on account of which environmentally friendly lower fuel consumption is simultaneously achieved.

Various paths are followed in the manufacture of leaf springs from fiber-composite materials. In resin transfer molding (RTM), as described in DE 10 2011 012 654 A1, for example, a dry semi-finished leaf spring is placed in a molding cavity, and the matrix material is injected into the molding cavity. The semi-finished leaf spring is soaked by the matrix material which is cured under pressure and heat. However, corresponding RTM tools are complex and costly. Moreover, there is the risk of the semi-finished leaf springs not being completely soaked and of the dry spots thus created diminishing the life span of the leaf springs.

In another method, individual layers of cut-to-length and pre-impregnated fiber material are stacked on top of one another in a partially manual manner, and the semi-finished leaf spring thus created is compressed in a pressing tool and cured. Here, the disadvantage lies in particular in that this process is very time consuming, such that its adequate employment in mass production is always also associated with long cycle times and high prices for the end product.

It is furthermore known to wind leaf springs by means of a suitable device. Here, mostly two or a plurality of semi-finished leaf springs are produced by way of a winding operation on a winding core. In particular, EP 0 005 916 A1 describes a method and a device for manufacturing a leaf spring from a fiber-composite material, in which tape material from a fibrous material, which has been pre-impregnated with a matrix resin, is wound onto a winding core. The tape material may be a fiber tape or similar. The finished semi-finished leaf springs are then removed from the winding core and are processed in a press under impingement by pressure and heat to form the finished leaf spring.

A leaf spring having cycle times which are suited to mass production may be made by employing a winding method. Moreover, pre-impregnated tape materials are very easy to handle. However, in the proposed method there is the risk that during manufacturing of the semi-finished leaf spring individual adjacent layers of the fiber material do not adhere to one another across the entire area. This may lead to faulty spots in the finished leaf spring and consequently to delamination of the fibrous layers and to sizeable shortening of the life span of the leaf spring.

It is thus the object of the invention to refine the methods and assemblies for manufacturing a leaf spring from composite material which are known from the prior art, and to provide a method and a device by way of which a cost-effective and durable leaf spring may be produced while achieving low cycle times in the production process.

The part of the object which relates to the method is achieved by a method according to the features of independent claim 1.

The invention relates to a method for manufacturing a leaf spring from a fiber-composite material, comprising the following method steps:
  providing tape material from a fibrous material, which has been pre-impregnated with a matrix resin;
  manufacturing a semi-finished leaf spring by winding the tape material under tension onto a winding core, wherein at least two cavities for shaping the semi-finished leaf spring are configured on the winding core in the winding direction on the circumferential side;
  pressing on the tape material by way of a contact pressure means, so as to adhesively connect adjacent layers of the tape material on the winding core, and for removing air pockets between adjacent layers of the tape material;
  removing the semi-finished leaf springs from the cavities of the winding core;
  manufacturing a leaf spring by compressing the semi-finished leaf spring while curing the matrix resin.

The tape material may be designed in various ways. It may be provided as a wide bundle of individual fibers which are oriented so as to be mutually parallel and which are held together by a few fibers which are oriented so as to be transverse to the preferred direction. It is also possible for the individual fibers of the fiber material to be interlaced or interwoven. There may be a single tape of which the width corresponds to the width of the semi-finished leaf spring to be manufactured, or there may be a plurality of tapes which are then deposited on the winding core so as to be parallel beside one another or else on top of one another. In this context, a person skilled in the art will be familiar with terms such as "tape", "towpreg", or "roving".

The fiber material is fibers from glass, carbon, aramid, or other materials which are usual in the manufacture of fiber-composite components.

The specific design embodiment of the tape material from fibrous material depends on the requirements which are set for the component to be made. The tape material and the fibrous material are selected so as to correspond to these requirements.

It is always a common feature of the tape materials used that they are pre-impregnated with a matrix resin. Such fiber materials are also known by the term "prepregs". The matrix resin may be thermoplastic or duroplastic materials. On account of having been pre-impregnated, the matrix resin is already present in the semi-finished leaf spring and, unlike in an RTM method, does not have to be injected in a complex manner into a dry preform. Good handling ability of these materials in production is also advantageous. They are typically slightly sticky at room temperature, but the matrix resin is not that liquid so as to contaminate the production facility by resin spray. This issue arises in particular in wet-winding methods where frequent cleaning work which in turn increases stoppage time is required.

The tape material is wound under tension onto a winding core. This is of particular relevance for the method according to the invention. On account thereof, the individual layers of the tape material are deposited on top of one another while avoiding air pockets to the greatest possible extent. During compression of the semi-finished leaf spring, air pockets cause faulty spots in the leaf spring, which have a negative influence on the mechanical properties of the spring. Delamination arises as a result, which in turn leads to a failure of the entire leaf spring. By keeping the tape material under tension during winding, the individual layers of the tape material bear on one another across the entire area and air pockets do not arise. Moreover, the individual layers are precisely deposited on top of one another without creases.

This is facilitated in that a contact pressure means is used which, on the one hand, once again mutually compresses the layers of the tape material, and moreover presses the fiber material into cavities which are configured on the winding core in order for the semi-finished leaf spring to be shaped. The contact pressure means thus enables adhesive connections without creases between adjacent layers across the entire area thereof, since the pre-impregnated tape materials are slightly sticky and thus may adhere to one another. The deeper this adhesion is developed, the better the cross-linking of the individual layers during downstream curing. This results in a more durable leaf spring which is more stable under load and has a long life span.

"Adjacent layers" within the scope of the invention and in this context are understood to be layers of the tape material which are deposited on top of one another during winding.

At the same time, it is finally ensured by way of contact pressure that any air pockets between the individual layers of the tape material are removed in that any air bubbles present are squeezed out of the semi-finished leaf spring. Avoiding air pockets and thus manufacturing a leaf spring which is free of faulty spots is in particular enabled by the interaction of crease-free winding under tension and ventilating by way of the contact pressure means.

The winding core in the winding direction on the circumferential side has at least two cavities for shaping the semi-finished leaf spring. In a completed leaf spring the majority of the fibers are oriented in the longitudinal direction of the spring. Accordingly, the tape material during the winding operation is deposited in layers on top of one another and/or beside one another, so as to be parallel in a preferred direction which corresponds to the longitudinal direction of the spring. This preferred direction during deposition of the tape material is referred to as the winding direction. The at least two cavities are configured so as to lie behind one another in the circumferential direction. On account thereof, it is possible for a plurality of semi-finished leaf springs to be simultaneously manufactured in one winding operation and for fiber material off-cuts to be kept as low as possible. At the same time, the semi-finished leaf springs are imparted their envisaged shape, on account of which handling during laying up in the pressing tool is facilitated and forming of the completed leaf spring is simplified.

Once the winding operation has been terminated, the tape material is cut off, and the completed semi-finished leaf springs are severed and removed from their cavities. Severing is performed by cutting or punching.

In a last method step, a pressing tool is provided with a separating agent, and the semi-finished leaf springs are laid up in the pressing tool, and the tool is closed. The semi-finished products are then impinged with a surface pressure of preferably 1 to 10 bar and a temperature of preferably 120° C. to 160° C. The matrix resin is cross-linked here and is cured, on account of which the leaf spring is created. The exact production parameters in terms of pressure and temperature depend on the matrix resin used and on the geometry of the leaf spring.

A plurality of semi-finished leaf springs are preferably processed simultaneously in one pressing tool. This again improves the cycle time in production.

The tool is preferably composed of an upper tool and a lower tool, both having a regulated temperature profile. It may also be provided for the temperature to be regulated in a regionally variable manner.

In one preferred embodiment of the invention it is provided that the winding core for winding the tape material rotates about a rotation axis which is perpendicular to the winding direction. This in particular simplifies the manufacturing process, since this dispenses with the requirement of an additional manipulator for depositing the tape material on the winding core. To this end, the leading end of the tape or of the tapes of fiber material is fastened to the winding core, for example clamped, adhesively bonded, or simply knotted thereto.

Furthermore preferably, the tape material is provided on a wound package and is drawn off from the wound package by the winding operation. This design embodiment also serves in improving the production sequence. On account of the rotation of the winding core, the tape material is automatically conveyed from the wound packages, which are fastened on a respective creel, to the winding core. In order to avoid twisting or tangling of the tape material, guide elements, for example Teflon rollers with grooves, may be provided.

As has already been explained, the tape material is wound onto the winding core under tension. In one further and particular embodiment of the invention, rotation of the wound packages is therefore regulated during drawing-off of the tape material. On account thereof, it is ensured that the tape material during winding always remains under tension and does not sag. Regulating the rotation of the wound packages is particularly preferably performed electronically.

In one further preferred embodiment, a plurality of tapes of the tape material are provided, wherein each tape has a width which is smaller than the width of the semi-finished leaf spring. The layered construction of the semi-finished leaf spring and thus of the completed leaf spring depends on the technical requirements which are set for the product. The use of a tape material which has the entire envisaged width of the semi-finished leaf spring does indeed enable relatively swift construction of the semi-finished product during winding; however, there is less flexibility in terms of the layered construction, and guiding of the material during winding is more complex. It is therefore preferably provided for the semi-finished product to be manufactured from narrower tape materials. Guiding the narrower tapes is simpler, and it is possible for various tape materials to be incorporated into the semi-finished leaf spring in a localized manner. Here, both the fiber materials as well as the construction of the tape materials per se in terms of their fiber-volume content or else their fiber orientation may be varied.

The ideal layer construction for the envisaged leaf spring is calculated at the outset. For example, a plurality of tape materials beside one another may form a layer of the semi-finished leaf spring. A plurality of tape materials on top of one another and/or beside one another and/or overlapping one another may also form a layer of the semi-finished leaf spring. The term "layer" in the context of the invention refers to a self-contained layer of a leaf spring which is constructed from a plurality of layers, in particular.

One further particular embodiment of the invention provides that the winding core during winding is moved by an envisaged distance in the direction of the rotation axis. This means to be a movement in the direction in which the rotation axis points. Thus, the winding core is displaced or moved back and forth on the rotation axis. This enables further variation potential in the design of the layer construction. On account thereof, it is possible for individual layers of tape material to be deposited on the winding core in a mutually offset manner.

In one advantageous refinement of this concept, tape material having a width which is smaller than the envisaged width of the semi-finished leaf spring is deposited on the winding core. The winding core between two revolutions is moved by a distance which is smaller than the width of the tape material, the distance preferably corresponding to half the width of the tape material. If a single tape material is used here, tape portions are deposited in a mutually overlapping manner and a layer of the semi-finished leaf spring is thus produced, it being ensured here that no gaps are created between the individual narrow tapes.

Even when a plurality of tape materials are wound onto the winding core in a mutually parallel manner, so as to collectively form one layer of the semi-finished leaf spring, these individual layers may be wound so as to be mutually offset, so as to avoid gaps in the semi-finished leaf spring.

Preferably, after a defined number of revolutions the winding core is moved in the respectively opposed direction, such that the tape material is wound in an alternatingly overlapping manner. During movement in the first direction, overlapping takes place in that first direction, while overlapping takes place in the other direction during movement in the second direction.

A layered construction in which a plurality of tape materials form one layer and the individual layers are mutually offset by exactly half a width of a tape material may be produced in this way, in particular. The tape materials here are deposited on the winding core in a mutually parallel manner, so as to form a first fibrous layer. The total width of the tape materials deposited in parallel is smaller than the envisaged width of the semi-finished leaf spring by half a width of a tape material. The first fibrous layer bears in a flush manner on a longitudinal side of the cavities of the winding core. After a first revolution, the winding core is moved in the direction of the rotation axis by a distance which corresponds to half the width of a tape material. Then a second fibrous layer is deposited on the winding core, the second fibrous layer being deposited so as to be flush with the other longitudinal side of the cavities of the winding core. After a further revolution, the winding core is moved in the direction which is opposed to the rotation axis by a distance which corresponds to half the width of a tape material. This procedure is continued in this way such that a layered construction in which the individual layers always lie on top of one another so as to be offset by half a tape width of the tape material is created. On account thereof, gaps in the semi-finished leaf spring and thus potential faulty spots in the finished leaf spring are avoided.

Apart from this particular embodiment of the method, any arbitrary layer construction may be produced, of course. Suitable movement of the winding core during the winding operation in particular enables the production of thickness variations in the leaf spring.

One further advantageous embodiment of the invention provides that prior to, during, or after winding, additional intermediate layers of fibrous material are incorporated into the semi-finished leaf spring. On account thereof, variation of the leaf spring cross section both in the longitudinal as well as the transverse direction of the leaf spring is enabled. The leaf spring may be thickened in a localized manner, for example. These additional intermediate layers may be any type of fibrous material. Textiles (that is to say woven fabrics or warp-knitted fabrics), individual or a plurality of fiber bundles, additional tape materials, and similar may be incorporated. Fiber materials from other materials than those mainly used for the leaf spring may also be incorporated, so as to produce particular localized properties of the leaf spring. The intermediate layers here may form a complete layer of the semi-finished leaf spring, or may be provided as a regional layer only.

In one further preferred embodiment of the invention it is provided that prior to, during, or after winding, at least one element from non-fiber material, for example from metal or an elastomer, is incorporated into the semi-finished leaf spring. These elements may likewise serve in reinforcing the leaf spring, or may influence the mechanical properties of the spring in a general and localized manner. It is also possible for attachment elements, such as bearing eyelets, for example, to be integrated into the leaf spring.

Particularly preferably, the force by way of which the contact pressure means presses on the tape material is adjusted. In particular, force by way of which the contact pressure means presses on the tape material may be electronically regulated.

Furthermore preferably, the tape material is pressed on by a contact pressure roller as the contact pressure means. The use of a contact pressure roller in particular offers the advantage that the fibrous material is pressed into the cavities in a particularly gentle manner and that any potential creases created are compensated. Removal of air pockets is also carried out in a technically very simple manner by a contact pressure roller. The roller is preferably not employed immediately after the tape material has been deposited on the winding core, so as to allow time for the fiber material to settle. If the winding core is a rotating winding core, the contact pressure roller may remain so as to be substantially locationally fixed.

In an advantageous additional method step the leaf spring after compression is subjected to further heat treatment. This leads to an advantageous effect on the cycle times, in that the leaf springs are removed from the pressing tool in a state in which they are not completely cured and for final curing are moved into an annealing furnace. The pressing tool in this case is more rapidly available for the next semi-finished leaf spring.

The leaf spring may also be in particular mechanically processed in an additional method step, for example may be subjected to cutting, punching, or to a grinding operation.

The invention furthermore relates to an assembly for manufacturing a leaf spring from a fiber-composite material, having a device for providing tape material from a fibrous material, which has been pre-impregnated with a matrix resin, and having a winding core which in the winding direction on the circumferential side has at least two cavities for shaping a semi-finished leaf spring, and having a contact pressure means by way of which adjacent layers of the tape material are adhesively connectable on the winding core and air pockets between adjacent layers of the tape material are removable, and having a tool for compressing the semi-finished leaf spring while curing the matrix resin for manufacturing a leaf spring.

On account of the embodiment of the device according to the invention having a contact pressure means, the production of leaf springs is improved in a plurality of respects. As has already been described above, it is of particular relevance for the invention that air pockets and creases are avoided in the manufacture of leaf springs from fiber-composite material. By way of the contact pressure means adjacent layers of the tape material are mutually compressed, and the entire semi-finished leaf spring is pressed into the shape-imparting cavities of the winding core. On account thereof, a deep and adhesive connection between the layers is produced, on account of which cross-linking of the matrix resin during the downstream curing operation is facilitated and improved. At the same time, existing air pockets are squeezed out of the semi-finished leaf spring.

A regulated reel means that rotation of the reel during the unwinding operation is controlled such that it is always ensured that the tape material is windable under tension onto the winding core.

Electronic regulation of the reel is provided in particular. On account thereof, a smooth flow in the production process is enabled.

The device according to the invention is not limited to a single reel being employed. In the context of the invention a plurality of reels having various tape materials may also be employed. These reels may be attached to a frame or a creel, for example.

In one preferred embodiment of the invention the contact pressure means is configured as a contact pressure roller. This contact pressure roller is preferably attached such that the wound tape material, after having been deposited onto the winding core, is pressed by the contact pressure roller. The contact pressure roller here rolls in the winding direction. On account thereof, air pockets between layers of the semi-finished leaf spring are squeezed out of the semi-finished product immediately after depositing of the tape material.

It is preferably also that the contact pressure force of the contact pressure means is adjustable. On account thereof, pressing may be performed in a manner which is tailored to the respective component. It is avoided that the matrix resin is squeezed out of the cavities on account of excessive contact pressure force and contaminates the winding core and other components of the device, or that the layers from fiber material are not mutually compressed over the entire area on account of insufficient contact pressure force. The contact pressure force is generally selected in the magnitude of a few bars. Adjustment of the contact pressure force may be performed by way of pneumatic or electromotive elements, or elements of similar design.

One further embodiment of the invention provides that the winding core for winding the tape material is rotatable about an axis which is perpendicular to the winding direction. This embodiment in particular serves for obtaining short cycle times. On account of the rotation of the winding core, the tape material is automatically drawn-off from the provision installations, so to speak. There is no requirement for a manipulator which guides the tape material around the winding core, whereas a simple rotation movement of the winding core is easier to generate.

On account of a suitable spatial movement of the winding core that superimposes rotation, the tape material may be kept under tension during winding, this being advantageous for the manufacture of the semi-finished leaf spring without air pockets.

In particular in interaction with the provision of the tape material on wound packages, in particular regulated wound packages, the tape material may be advantageously wound under tension.

Furthermore, the invention is designed in such a manner that the winding core is movable in the direction of the rotation axis. On account thereof, it is possible for the tape material to be wound in an overlapping manner. On account thereof, it may be ensured that no gaps and potential faulty spots are created in the semi-finished leaf spring.

Exemplary embodiments of the invention will be explained in the following description of the figures, in which.

Figure 1:
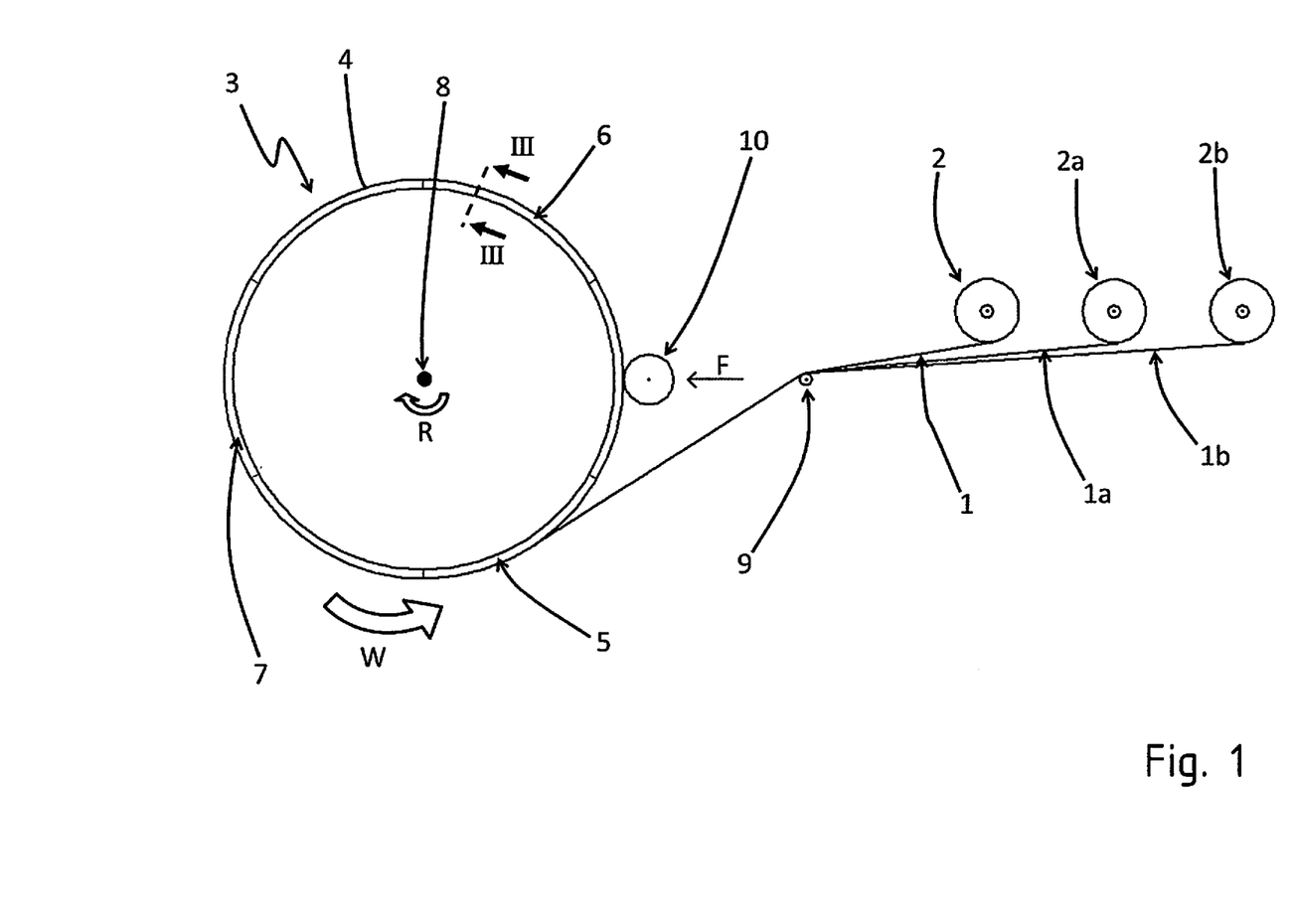
FIG. 1 shows a device for manufacturing a semi-finished leaf spring.

That part of the method according to the invention which has winding of tape material 1, 1*a*, 1*b* onto a winding core 3 as a subject matter is illustrated in FIG. 1. The tape material 1, 1*a*, 1*b* is provided on reels 2, 2*a*, 2*b*. The tape material 1, 1*a*, 1*b* throughout is so-called towpregs, which are polymer-resin pre-impregnated bundles of fiberglass material. The material of which the fibers are composed and the matrix resin are generally selected depending on the technical requirements set for the leaf spring.

The number of towpregs which are simultaneously applied to the winding core 3 is selected depending on the envisaged width of the completed leaf spring and the desired fiber content. This may therefore be a single tape material 1, 1*a*, 1*b*, or else a plurality of tape materials 1, 1*a*, 1*b*, that is to say at least two tape materials 1, 1*a*, 1*b*, may be used. It is also possible for a plurality of tape materials 1, 1*a*, 1*b* to be simultaneously wound beside one another and on top of one another. In this case, ten or more tape materials 1, 1*a*, 1*b* are provided in most cases. For the sake of simplicity in the illustration, only three tape materials 1, 1*a*, 1*b* are illustrated in FIG. 1.

The tape materials 1, 1*a*, 1*b* have a width of in each case two to ten millimeters. The resin content is 0.5 to 1.5 grams/meter. In another variant, a single tape material of which the width corresponds to the width of the completed leaf spring is used.

The tape material 1, 1*a*, 1*b* is guided via guide elements 9 to the winding core 3 and fixed to the latter. The guide elements 9 may be plastic rollers, for example, or else pipes, rail elements, and similar. Optionally, a separating film may still have to be removed from the tape material 1, 1*a*, 1*b* being used, for example in that a winding unit (not illustrated in more detail) pulls off the separating film in a direction which is opposed to the guiding direction of the tape material 1, 1*a*, 1*b*. Mechanical types of fastenings, such as clamps or knots, as well as materially integral connections, such as the use of an adhesive, may be used for fastening the tape materials 1, 1*a*, 1*b* to the winding core 3. In particular, the matrix resin which is present in the tape material 1, 1*a*, 1*b* may be used for an adhesive connection, in that said matrix resin is briefly heated, on account of which the resin becomes viscous and sticky.

Three cavities 5, 6, 7, which serve in shaping the semi-finished leaf spring, are provided in the surface 4 of the winding core 3. On the circumferential side, said cavities are configured in a winding direction W. The geometry of the cavities 5, 6, 7 corresponds to the envisaged external design embodiment of the semi-finished leaf springs. It has to be noted here that during the manufacture of the completed leaf spring the semi-finished leaf spring is compressed in a tool (not illustrated) and under circumstances may be subject to dimensional modification. This dimensional modification has to be correspondingly considered in the design concept of the semi-finished product.

The tape material 1, 1*a*, 1*b* is wound in a winding direction W under tension and in a crease-free manner onto the winding core 3. This is ensured by regulating the reels 2, 2a, 2b, preferably in an electronic manner. Regulation is of a type such that the tape material 1, 1a, 1b is at all times under tension and does not sag at any point of the infeed path. This is facilitated by the guide elements 9. The winding core 3 here preferably rotates in a rotation direction R about a rotation axis 8. This rotation movement is likewise controlled, so as to be able to ensure winding under tension. A robot or a manipulator may be used here in order to rotate and move the winding core 3; however, rotating the winding core about a fixed axis is also possible.

The winding core 3 here is equipped with three cavities 5, 6, 7. However, only two or else four or more cavities may also be provided. The design embodiment of the winding core 3 and the motion diagram of the latter during the winding operation may be correspondingly more complex as a result thereof.

On account of the tape material 1, 1a, 1b being wound under tension onto the winding core 3, it is to be avoided that air pockets are formed between individual fibrous layers of the semi-finished leaf spring. This is facilitated by pressing the tape materials 1, 1a, 1b by way of a contact pressure means 10. In the present example the contact pressure means 10 is designed as a contact pressure roller. The contact pressure means 10 by way of a contact pressure force F presses the tape material 1, 1a, 1b into the cavities 5, 6, 7. On account thereof, air pockets between the fibrous layers are squeezed out and the fibrous layers are simultaneously adhesively interconnected. The matrix resin of the tape material 1, 1a, 1b is slightly sticky, such that the individual fibrous layers lying on top of one another readily adhere to one another on account of the pressure of the contact pressure means 10. On account of these measures, the individual fibrous layers bear on one another across their entire area. On account thereof, the downstream curing process in which the molecules of the matrix resin are mutually cross-linked is also facilitated, and the quality of the completed leaf spring is improved.

Once the winding process has been terminated, the tape materials 1, 1a, 1b are cut off and the completed semi-finished leaf springs are removed from the cavities 5, 6, 7. The semi-finished leaf springs are laid up in a heated tool (not illustrated in more detail) which preferably is composed of an upper tool and a lower tool and which preferably has isothermal temperature control. A molding cavity, the inner surface of which corresponds to the geometry of the completed leaf spring, exists between the upper tool and the lower tool. The inner surface of the tool is provided with a separating agent, so as to facilitate removal of the completed leaf spring later on. Once the tool has been closed, the semi-finished leaf spring is impinged by a surface pressure of 1 to 10 bar and a temperature of 120° C. to 160° C. for 5 to 60 minutes, such that the matrix resin is cross-linked and cured.

Once the completed leaf spring has been removed, it may be subjected to a further thermal treatment process in an annealing furnace. Likewise, further mechanical processing steps, such as cutting or the introduction of bores, may be provided.

The construction of the leaf spring from individual layers of fiber material depends on the technical requirements for the leaf spring. Accordingly, the tape material 1, 1a, 1b is selected in terms of the fiber material (glass, carbon, aramid, and similar), the matrix resin (for example duroplastics, thermoplastics), and the supplied form (rovings, towpreg, tape, woven or cross-laid textile, and similar), and a suitable layered construction is calculated. A multiplicity of potential variations are available for selection here.

Figure 2:
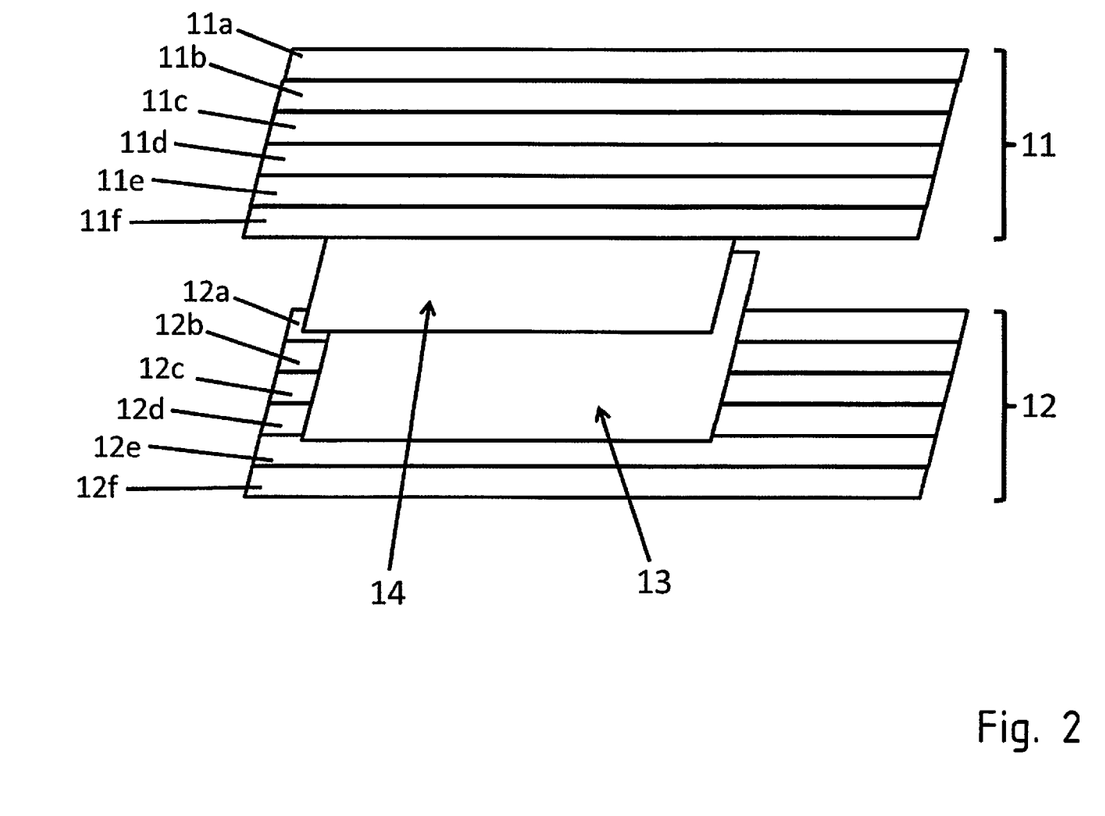
FIG. 2 shows a layered fibrous construction having additional fibrous layers.

An exploded illustration of a layered construction in which additional intermediate layers 13, 14 from a fibrous material are incorporated between individual fibrous layers 11, 12 is shown in FIG. 2. These intermediate layers 13, 14 lead to localized thickening of the completed leaf spring. This is necessary in leaf springs which are installed in a chassis in the longitudinal direction of the vehicle (longitudinal leaf springs), for example. The portions by way of which these leaf springs are connected to the chassis have a longer cross section than the remainder of the spring. In FIG. 2 the fibrous layers 11, 12 consist of individual tape materials 11a-f, 12a-f, which are deposited so as to be flush next to one another. The semi-finished leaf spring is constructed from fibrous layers 11, 12 which are layered on top of one another, in that the tape materials 11a-f, 12a-f are wound onto the winding core 3. The winding operation is stopped and the intermediate layers 13, 14 are incorporated into the semi-finished leaf spring manually or in an automated manner at envisaged points in time, presently after the fibrous layer 12 has been applied. The intermediate layers 13, 14, which are also referred to as patches, in this case are woven textile layers which are as wide as the fibrous layers 11, 12. Thereafter, the winding operation is continued by applying the fibrous layer 11.

When individual tape materials 11 a-f, 12a-f are wound beside one another so as to obtain fibrous layers 11, 12, as is illustrated in FIG. 2, there is the risk that gaps due to tolerances are created between the tape materials 11a-f, 12a-f. If this arises in a plurality of fibrous layers 11, 12 in sequence, air pockets which may lead to faulty spots in the completed leaf spring are again created also here. This may be addressed by suitable winding techniques, one of which is explained in FIGS. 3a to 3d. The section III-III through the cavity 6 of the winding core 3 is shown in FIGS. 3a to 3d. The cavity is incorporated in the surface 4 of the winding core 3. The winding core 3 is configured so as to be movable in a movement direction B in the direction of the rotation axis 8. Preferably the movement takes place on the rotation axis 8. Furthermore the winding core 3 is displaced relatively movable on the rotation axis 8.

Figure 3A:
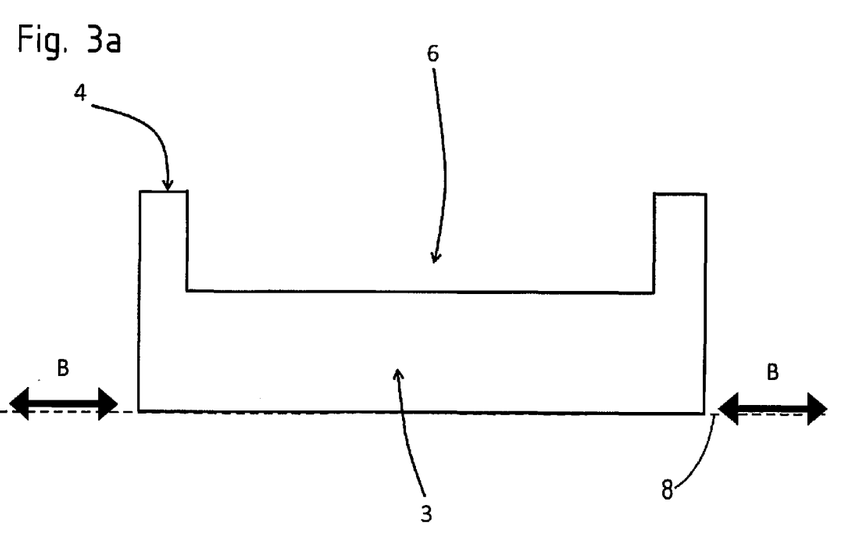
FIGS. 3*a* to 3*e* show a method according to the invention for manufacturing a leaf spring and FIG. 4 a schematic view of an assembly to manufacture a leaf spring.
Figure 3B:
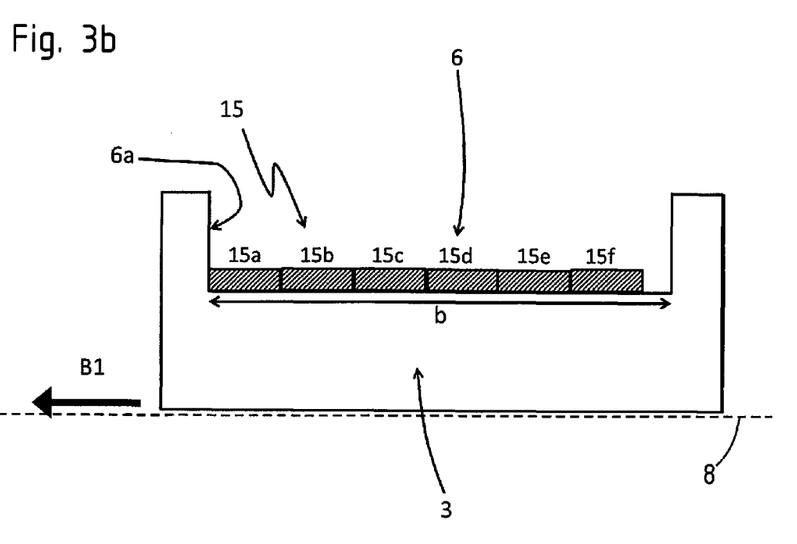
Figure 3C:
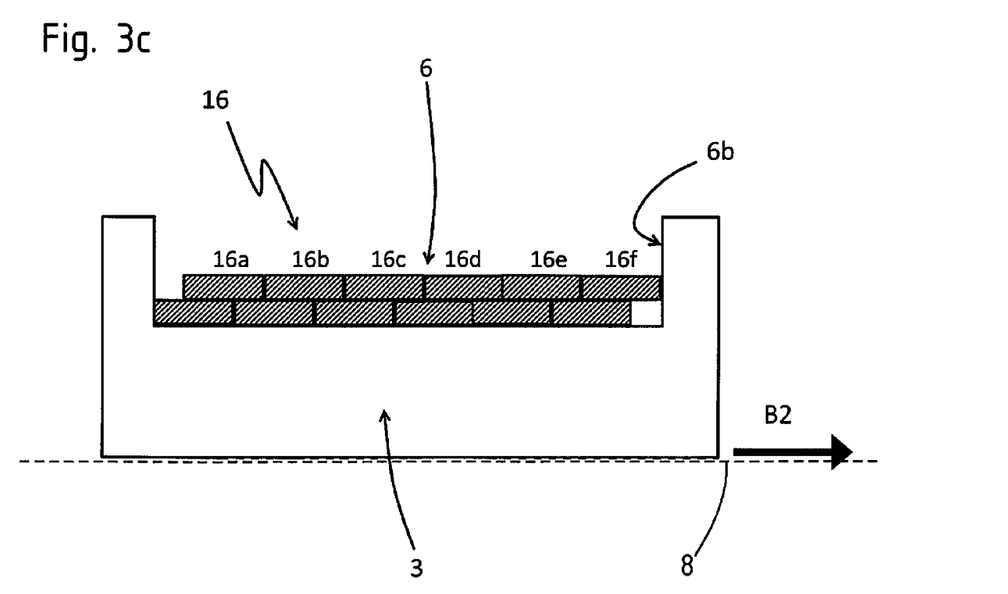
Figure 3D:
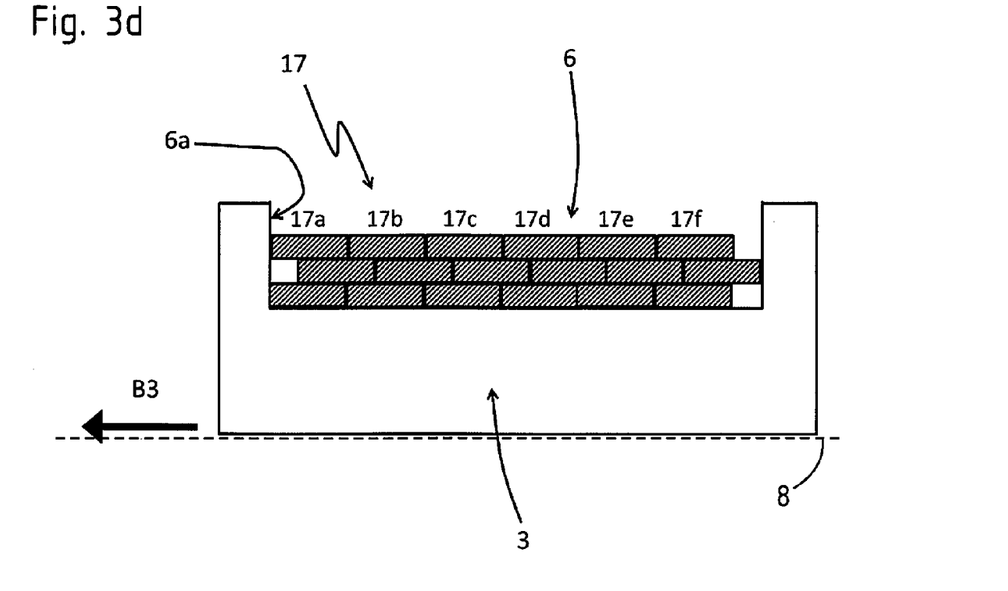
Figure 3E:
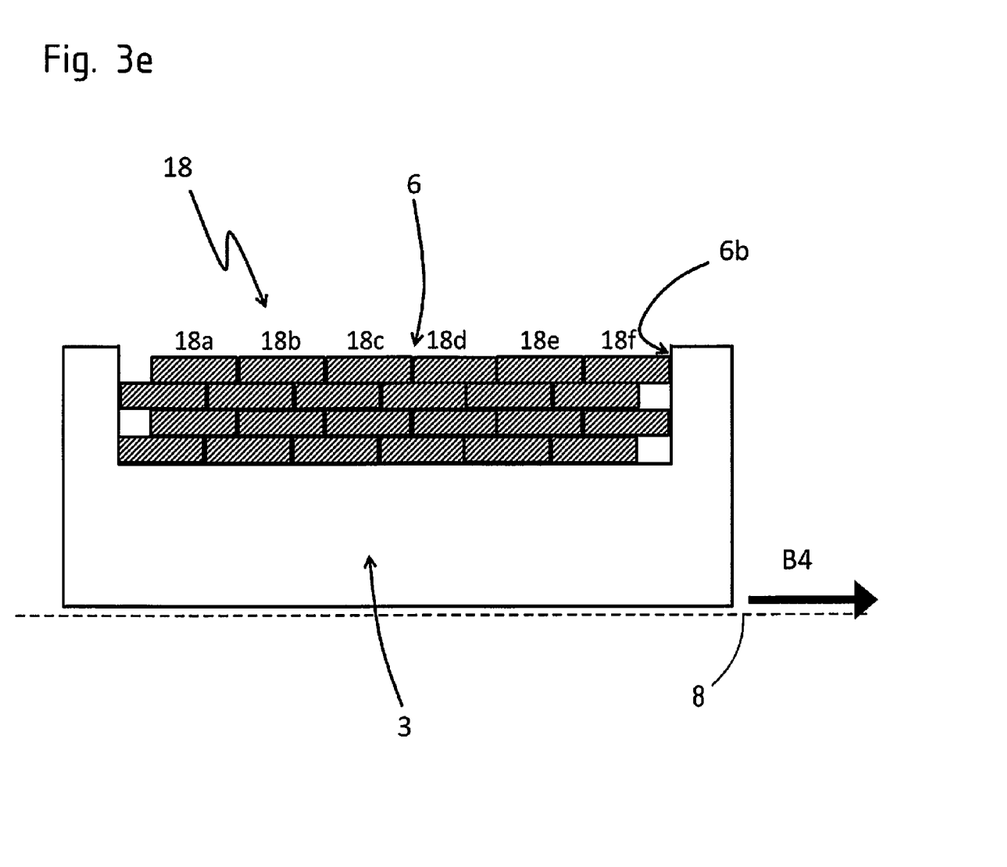

In the first revolution of the winding core 3 a fibrous layer 15, which is composed of individual tape materials 15a-f, is wound so as to be flush with a side wall 6a of the cavity 6 (FIG. 3b). The width of the tape materials 15a-f here is selected such that a fibrous layer is narrower than the width b of the cavity 6 by half a width of the tape materials 15a-f. After the first revolution the winding core 3 is displaced by a movement B1 on the rotation axis 8 of the winding core 3 by a distance which preferably corresponds to half the width of a tape material 15a-f. It is self evident that the illustration of FIGS. 3a to 3e is not to be considered to scale and serves only for clarifying the principle of the method.

During the second revolution of the winding core 3 (FIG. 3c) a fibrous layer 16, which is composed of individual tape materials 16a-f, is wound so as to be flush with the other side wall 6b of the cavity 6. The tape materials 16a-f here cover the abutment edges of the tape materials 15a-f lying therebelow. After the second revolution the winding core 3 is displaced in the opposing direction by a movement B2 on the rotation axis 8 of the winding core 3 and then is located back in its initial position.

During the third revolution of the winding core 3 (FIG. 3d) a fibrous layer 17, which is composed of individual tape materials 17a-f, is wound so as to be flush with the side wall 6a of the cavity 6. The winding core 3 thereafter is again displaced by a movement B3 which is analogous to the movement B1. Thereafter, there is a fourth revolution of the winding core 3 (FIG. 3*e*), wherein a fibrous layer 18, which is composed of individual tape materials 18*a-f*, is wound so as to be flush with the other side wall 6*b* of the cavity 6, whereupon the winding core 3 is displaced by a movement B4 which is analogous to the movement B2. This continues until the semi-finished leaf spring has been completed.

The winding core 3 after each revolution is thus alternatingly displaced in the respective opposing direction, such that the tape material is wound in an alternatingly overlapping manner and no undesirable gaps and air pockets are created in the semi-finished leaf spring.

Figure 4:
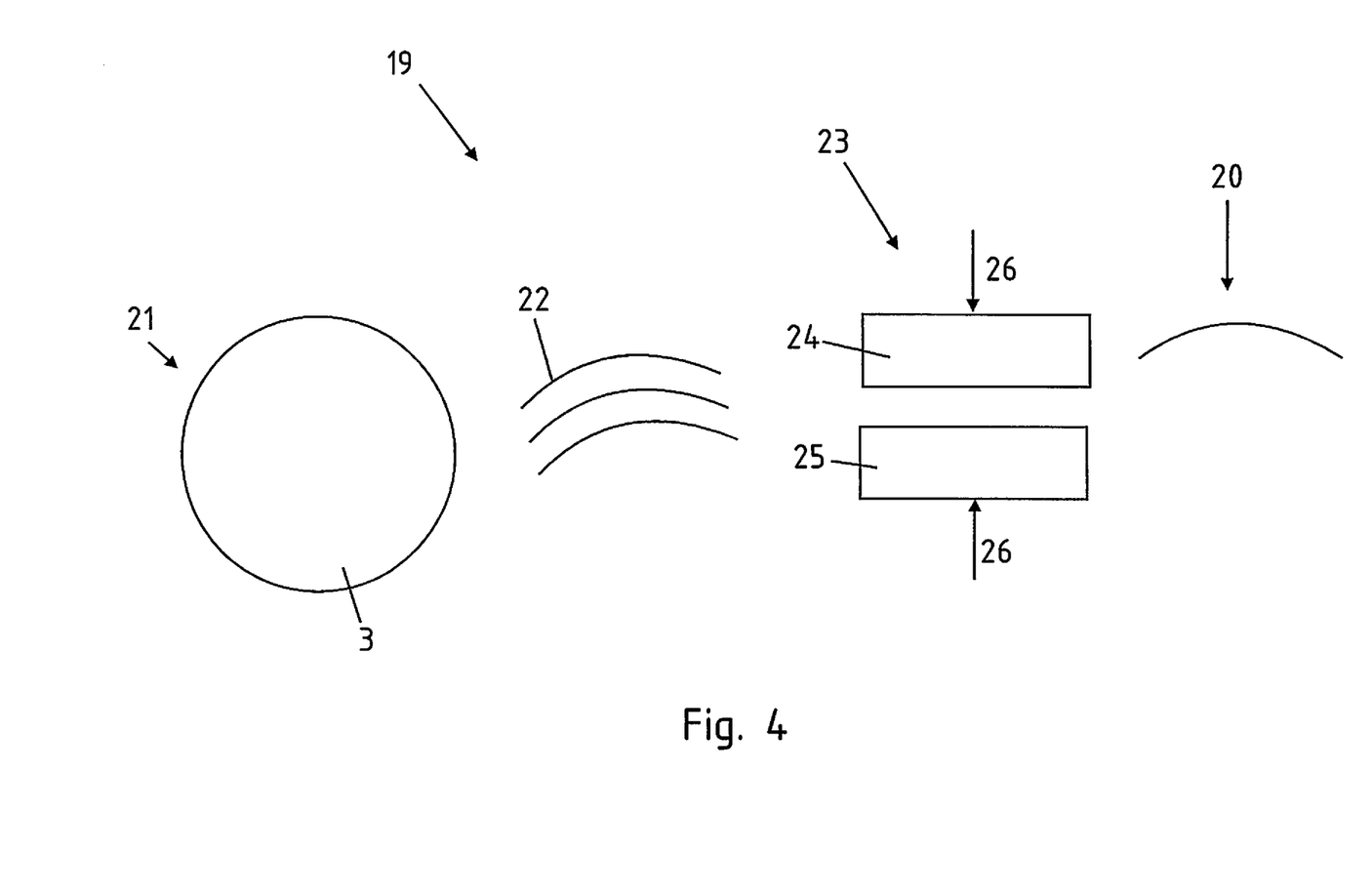

FIG. 4 shows an assembly 19 to manufacture a leaf spring 20. The assembly 19 initially includes the device 21 to manufacture a semi-finished leaf spring 22, as described before. For that matter the winding core 3 is wound in the above described manner, wherein at least two semi-finished leaf spring springs 22, preferred three semi-finished leaf springs 22 are produced. These are then fed into a downstream tool 23 for compressing the semi-finished leaf spring inserted therein. For example, the tool 23 for compressing is build as forming press which has an upper tool 24 and lower tool 25. By applying a pressing force 26 the tool is closed and the produced leaf spring can be removed after opening the tool.

The invention claimed is:

1. A method for manufacturing a leaf spring from a fiber-composite material, comprising the following method steps:
    providing tape material from a fibrous material, which has been pre-impregnated with a matrix resin;
    manufacturing a semi-finished leaf spring by winding the tape material under tension onto a winding core, wherein at least two cavities for shaping the semi-finished leaf spring are configured on the winding core in the winding direction on a circumferential side;
    pressing on the tape material by way of a contact pressure means, so as to adhesively connect adjacent layers of the tape material on the winding core, and for removing air pockets between adjacent layers of the tape material;
    removing the semi-finished leaf springs from the cavities of the winding core;
    manufacturing a leaf spring by compressing the semi-finished leaf spring while curing the matrix resin;
    wherein the winding core for winding the tape material rotates about a rotation axis which is perpendicular to the winding direction; and
    wherein the winding core between two revolutions is displaced along said rotation axis by a distance which is smaller than the width of the tape material.

2. The method as claimed in claim 1, wherein the tape material is provided on a reel and is drawn off from the reel by winding the tape material onto the winding core.

3. The method as claimed in claim 2, wherein rotation of the reel is regulated during drawing-off of the tape material.

4. The method as claimed in claim 1, wherein a plurality of tapes of the tape material are provided, wherein each tape material has a width which is smaller than a width of the semi-finished leaf spring.

5. The method as claimed in claim 1, wherein after a defined number of revolutions the winding core is moved in the respectively opposed direction, such that the tape material is wound in an alternatingly overlapping manner.

6. The method as claimed in claim 1, wherein prior to, during, or after winding, additional intermediate layers of fibrous material are incorporated into the semi-finished leaf spring.

7. The method as claimed in claim 1 wherein prior to, during, or after winding, at least one element from non-fiber material, for example from metal or an elastomer, is incorporated into the semi-finished leaf spring.

8. The method as claimed in claim 1, wherein a contact force by way of which the contact pressure means presses on the tape material is adjusted.

9. The method as claimed in claim 1, wherein the tape material is pressed on by a contact pressure roller as the contact pressure means.

10. The method as claimed in claim 1, wherein in an additional method step the leaf spring after compression is subjected to further heat treatment.

11. The method as claimed in claim 1, wherein the winding core between two revolutions is moved by a distance corresponding to half the width of the tape material.

* * * * *